United States Patent
Jianu

(10) Patent No.: US 11,402,466 B2
(45) Date of Patent: Aug. 2, 2022

(54) MOTOR VEHICLE WITH A RADAR SENSOR AND METHOD FOR OPERATING THE MOTOR VEHICLE

(71) Applicant: AUDI AG, Ingolstadt (DE)

(72) Inventor: Alin Jianu, Ingolstadt (DE)

(73) Assignee: Audi AG, Ingolstadt (DE)

(*) Notice: Subject to any disclaimer, the term of this patent is extended or adjusted under 35 U.S.C. 154(b) by 224 days.

(21) Appl. No.: 16/934,648

(22) Filed: Jul. 21, 2020

(65) Prior Publication Data
US 2021/0033702 A1   Feb. 4, 2021

(30) Foreign Application Priority Data
Jul. 30, 2019 (DE) ............... 10 2019 211 375.3

(51) Int. Cl.
*G01S 7/40*        (2006.01)
*G01S 13/931*      (2020.01)

(52) U.S. Cl.
CPC ............ *G01S 7/4017* (2013.01); *G01S 7/40* (2013.01); *G01S 13/931* (2013.01); *G01S 7/4039* (2021.05)

(58) Field of Classification Search
CPC ........ G01S 7/4017; G01S 7/40; G01S 13/931; G01S 7/4039; G01S 7/4091; G01S 7/02; G01S 7/4004; G01S 2013/9322
See application file for complete search history.

(56) References Cited

U.S. PATENT DOCUMENTS

| | | | |
|---|---|---|---|
| 6,278,399 B1 | 8/2001 | Ashihara | |
| 7,486,222 B2 * | 2/2009 | Matsuoka | G01S 7/4004 343/872 |
| 9,653,802 B2 | 5/2017 | Kech | |
| 2009/0079618 A1 | 3/2009 | Harwood et al. | |

FOREIGN PATENT DOCUMENTS

| | | |
|---|---|---|
| DE | 60016064 T2 | 11/2005 |
| DE | 102009032124 A1 | 1/2011 |
| DE | 102010018782 A1 | 11/2011 |
| DE | 102013010922 A1 | 12/2014 |
| DE | 102013214324 A1 | 1/2015 |
| DE | 102017209591 A1 | 12/2018 |
| EP | 2394882 A1 | 12/2011 |

* cited by examiner

*Primary Examiner* — Vladimir Magloire
*Assistant Examiner* — Artem Melkunov
(74) *Attorney, Agent, or Firm* — Sterne, Kessler, Goldstein & Fox P.L.L.C.

(57) ABSTRACT

A motor vehicle having at least one radar sensor, which is mounted behind a radome, formed by a component of the motor vehicle to be radiated through, and/or having a radome, wherein the motor vehicle further includes a reference structure having at least one radar-detectable marker, which can be controlled by an adjusting apparatus and moved into a measuring position in the detection area of a radar sensor outside the radome, and a control apparatus configured to control the adjusting apparatus, based on a trigger signal, for moving the reference structure into the measuring position and to evaluate radar data recorded by the radar sensor describing the reference structure in the measuring setting through a comparison with a comparison data set stored in the control apparatus and recorded without deposition on the radome for detection of the potential deposition. The trigger signal indicates a potential deposition, which restricts the performance of the radar sensor, on the radome.

11 Claims, 1 Drawing Sheet

MOTOR VEHICLE WITH A RADAR SENSOR AND METHOD FOR OPERATING THE MOTOR VEHICLE

TECHNICAL FIELD

The present disclosure relates to a motor vehicle having at least one radar sensor which is installed behind a radome formed particularly by a component of the motor vehicle to be radiated through and/or having a radome. The present disclosure also relates to a method for operating such a motor vehicle.

BACKGROUND

The use of radar sensors in motor vehicles is already well known from the prior art. Nowadays, radar sensors are mostly used as environment sensors for a medium and larger distance area in order to be able to determine the distance, angle and relative speed of other traffic participants or larger objects. Such radar data can be integrated into environment models or immediately provided to vehicle systems. Radar data are used in the known prior art for longitudinal guidance systems such as ACC, safety systems and other vehicle systems. Radar sensors are also particularly relevant for the fully automatic guidance of the motor vehicle.

For design reasons and to protect the radar sensors, radar sensors in motor vehicles are usually mounted in a covered manner, i.e., behind a component of the motor vehicle which is to be radiated through by the radar beams during measurement. Such a component to be radiated through can be understood as a radome of the radar sensor as it covers the sensor in the detection area. However, also in other cases radar sensors are usually assigned a housing, which is at least in portions formed as a radome.

The performance of a radar sensor in a motor vehicle may be affected by the deposition of layers on the radome, which forms a part of the outer surface of the motor vehicle. Such depositions can, for example, consist of snow, ice, water, dirt and the like. This can lead to a delayed or even non-detection of objects in the detection area of the radar sensor, wherein this effect can be described as "attenuation." Another possible effect of depositions on the radome is that the position of detected objects is perceived to be offset by the radar sensor ("angular distortion").

In the prior art, algorithms have already been proposed in order to be able to detect these effects hindering the radar measurement and to be able to initiate appropriate measures, for example, if possible, corrective measures, adjustments of reliability values assigned to the radar data and/or even deactivating the radar sensor. The problem here is that ultimately there is no "basic truth" for detection algorithms for depositions, and a long period of time, for example between 30 seconds and a plurality of minutes, is required before a clear statement about a deposition can be made. This is based on the fact that a compromise is made to achieve an acceptable false positive rate. The resulting transition between the state in which the radar sensor's perception is impaired and the detection of this restriction by the radar sensor is particularly critical and can lead to irregularities in functions that use the radar data from the radar sensor.

DE 10 2017 209 591 A1 relates to a body part for a vehicle and a device for detecting a vehicle. It is proposed there to provide a plurality of defined radar reflectors, particularly at the back side of a motor vehicle, which at least partially reflect back a radar radiation incident thereon in the direction of a radiation source emitted by the radar radiation, and which are integrated into the body part. In this manner, the radar-based detection of vehicles is to be improved in a cost-effective and space-saving manner.

DE 10 2013 010 922 A1 relates to a test arrangement for ensuring the functional security of a radar sensor mounted at the front or the rear of a motor vehicle in the production process of the motor vehicle. For this purpose, a test arrangement, which is provided separately from the motor vehicle in the production process, is adjusted in such a manner that a respective laser source is arranged on both sides of the motor vehicle. These laser sources are aligned perpendicularly to the extension direction of the rotational axis on a crossbeam mounted in front of the front or behind the rear of the motor vehicle and adjustable in the alignment thereof to the motor vehicle. The first target marks are located on the crossbeam, which interact advantageously with the laser sources in such a manner that the crossbeam can be aligned exactly with the rotational axis and the laser sources. Thus, the position of the crossbeam required for the actual test procedure can be easily and advantageously reached. The test arrangement may have radar reflectors having different counter radiation characteristics to simulate radar targets both in defined directional orientation to the radiation center of the radar sensor and at different distances. The radar reflectors can be triple mirrors.

DE 10 2010 018 782 A1 relates to a test device for a driver assistance system, which is connectable to the rear of a carrier vehicle by means of a coupling and which is drivable on a road surface by means of a wheel. The test device comprises a first and a second carrier part, which are adjustable against each other. An artificial radar target point, for example a triple mirror, can be provided on the first carrier member.

BRIEF DESCRIPTION OF DRAWINGS/FIGURES

DETAILED DESCRIPTION

Figure 1:
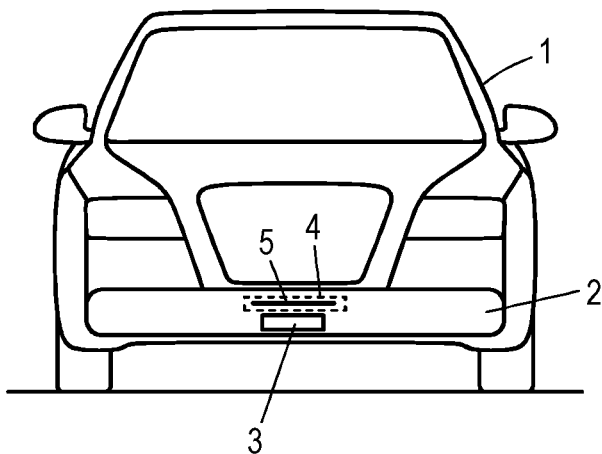
FIG. 1 shows a schematic sketch of a front view of a motor vehicle, in accordance with some embodiments.

The object of the present disclosure is to provide an improved and particularly faster way of reliably detecting depositions on a cover to be radiated through of a radar sensor in a motor vehicle.

In order to solve this object, in the case of a motor vehicle of the initially mentioned type, the present disclosure provides that the motor vehicle, in accordance with some embodiments, further has the following:

a reference structure having at least one radar-detectable marker, which can be controlled by an adjusting apparatus and moved into a measuring setting in the detection area of the radar sensor outside the radome, and a control apparatus which is designed, in the presence of a trigger signal indicating a potential deposition, which restricts the performance of the radar sensor, on the radome, to control the adjusting apparatus for moving the reference structure into the measuring setting and to evaluate radar data, received from the radar sensor, describing the reference structure in the measuring setting through comparison with a comparison data set of the reference structure, stored in the control apparatus and recorded without deposition on the radome, for the detection of the potential deposition.

In some embodiments, a radar sensor may be integrated in the motor vehicle. To measure objects, for example, the markers, with previously known properties in a previously known constellation, the radar sensor is configured to determine the performance of the detection thereof "immediately." In order not to interfere with the detection activity of the radar sensor during normal operation of the motor vehicle and therefore of the radar sensor, the reference structure is in this case not within the detection area of the radar sensor but in a preferably covered rest setting not affecting the outer appearance of the motor vehicle. If, however, there is a first indication of a restriction in performance, a trigger signal is thus given which indicates a possible deposition on the radome and was preferably generated by the radar sensor itself, the control apparatus controls the adjusting apparatus to bring the measuring structure into a defined measuring position or measuring setting, in such a manner that at least the markers are located in the detection area of the radar sensor, wherein the measuring position corresponds to a constellation for which the radar sensor has recorded a comparison data set in a previous measurement. The radome, which forms a part of the outer surface of the motor vehicle, may be a part of a component of the motor vehicle behind which the radar sensor is mounted, or it may also form a part of the radar sensor, particularly in the case of a non-covered construction, and thus particularly form a part of the housing.

In some embodiments, this prior measurement, which occurs for example during the manufacture of the motor vehicle, and in any case when the motor vehicle is clean, and preferably under ideal measuring conditions, preferably delivers a comparison data set of the reference structure in the measuring setting, in which the performance of the radar sensor is impaired at most by the radome itself. The comparison data set is stored in a memory means of the control apparatus.

At the later time, at which a first indication of a restriction of the performance exists and thus the trigger signal is generated, the reference structure is again shortly displaced into the defined measuring setting in the detection area of the radar sensor to record radar data again, particularly regarding the markers. Even smaller restrictions of the performance, particularly due to depositions on the radome, manifest themselves now in a deviation of these current radar data from the comparison data set, in such a manner that, if a relevant deviation is established in the comparison, appropriate measures can be taken. In some embodiments, a comparison criterion can be provided, which evaluates the deviation and, if the deviation is too high, assumes a restriction of the measuring operation by deposition requiring a measure. It should be noted that within the scope of the evaluation of the radar data and the comparison, other evaluation information can of course also be determined, for example a deposition strength, correction information and the like.

In some embodiments, the recording of the comparison data set and the current radar data of the reference structure can be performed in a common measuring mode of the radar sensor, however, a special measuring mode can also be used especially for the recording of these data sets to be compared. For example, it is conceivable to use an increased frequency bandwidth compared to the normal operation for recording the comparison data of the comparison data set and the current radar data of the reference structure in the measuring setting. An increased frequency bandwidth increases the spacing resolution, in such a manner that even objects located closely in front of the radar sensor, and/or the radome, here the markers, can be detected more reliably. It is generally useful to arrange the reference structure in the detection area relatively close in front of the radar sensor, for example at a spacing of a few centimeters, for example less than 10 cm. This also has the advantage that the reference structure does not have to be extended that far away from the motor vehicle. Particularly, it is conceivable, for example, to position the reference structure directly or very close to the radome, for example, formed by a bumper element or housing of the radar sensor, wherein a certain tolerance margin for the deposition is appropriately left.

In some embodiments, if the trigger signal occurs during operation of the motor vehicle, the reference structure is only shortly positioned in the detection area of the radar sensor to interrupt the other measuring operations only for a short time. Accordingly, a radar measurement can be performed very quickly. For example, it may be provided that, after recording the radar data, the control apparatus is formed to control the adjusting apparatus for removing the reference structure from the measuring setting, particularly back to the aforementioned rest setting, wherein preferably the reference structure is located in the measuring setting for less than 10 seconds, preferably less than 2 seconds.

The evaluation of the radar data, particularly the comparison with the comparison data set, refers mainly, particularly even exclusively, to the radar data and comparison data relating to the markers, to keep the influences of an otherwise changed environment as low as possible. Clearly defined radar targets are already given by the markers, which deliver a basically known reflection pattern, since the predefined arrangement of the markers on the reference structure is also known.

In some embodiments, the reference structure has at least one retroreflector in a predetermined position in the measuring setting relative to the radar sensor, particularly a triple mirror. A retroreflector is a device, which reflects incident electromagnetic waves largely in the direction from which they were emitted, regardless of the direction of incidence and the alignment of the reflector. Therefore, such retroreflectors, which can be formed as triple mirrors, form excellent radar markers whose reflection centers can be easily detected and identified even at a short spacing from the radar sensor. Specifically, it may be provided that at least one retroreflector is arranged on a carrier member, particularly a bow. The carrier member is preferably kept relatively low to be able to execute the reflector structure light but stable. A sufficient stability is useful regarding effects such as airflow and the like.

In some embodiments, the radar sensor directed toward the forefield of the motor vehicle is mounted in a covered manner in a front section of the motor vehicle and the reference structure can be extended from a covered rest setting in the front section into the measuring setting, particularly by using a hatch. By way of a non-limiting example, it may be provided in this context that the component to be radiated through is a bumper element of a bumper and/or a grille and the adjusting apparatus is mounted in the bumper or the grille; wherein the reference structure is arranged in a covered manner in the bumper or the grille in the rest setting. Thereby, the present disclosure is however not limited to radar sensors directed toward the forefield of the motor vehicle, but particularly can also be implemented for example for radar sensors mounted in a rear bumper directed toward the back area of the motor vehicle or also for sideways directed radar sensors.

Besides the motor vehicle, the present disclosure also relates to a method for operating a motor vehicle according to some embodiments, wherein
- in the absence of the deposition on the radome having the radar sensor, the comparison data set of the reference structure located in the measuring setting is recorded and stored in the control apparatus,
- in the presence of the trigger signal indicating a potential deposition on the radome restricting the performance of the radar sensor, the reference structure is moved into the measuring setting, and the radar data recorded by the radar sensor describing the reference structure in the measuring setting are evaluated by comparison with the comparison data set stored in the control apparatus and recorded without deposition on the radome for the detection of the potential deposition.

All embodiments relating to the motor vehicle can be transferred analogously to the method according to the invention and vice versa, wherein the operation of the motor vehicle in the present case refers to the operation of the radar arrangement given by the control apparatus, the reference structure having an adjusting apparatus and the radar sensor. It should be noted that the control apparatus may also be realized at least partially or entirely within the radar sensor itself, particularly in the case of a radar sensor formed in semiconductor technology, especially CMOS technology. For example, a radar sensor control unit may form a part or even the whole control apparatus.

In some embodiments, if the deposition on the radome is established, particularly if at least one comparison criterion is fulfilled, to which a measure is assigned, the at least one measure can be triggered by the control apparatus, in particular parameterized with a deposition strength determined within the scope of the comparison. Specifically, a measure can be an instruction output to a driver of the motor vehicle and/or particularly a correction procedure of the radar data using the comparison result and/or an output of a reliability value describing a reduced reliability, particularly as a function of the deposition strength, having the radar data. Corresponding measures are already known from the prior art and do not need to be explained in detail here. Particularly regarding the correction procedures, it should be noted that for certain types of depositions and/or deposition strengths, suitable correction values and the like, for example in a look-up table, can also be deposited in the memory means of the control apparatus. In addition, it is also possible to deactivate the radar sensor at least temporarily if the depositions are extremely strong or the performance is impaired.

In some embodiments, the trigger signal can be determined in a practical manner by evaluating radar data from the radar sensor. By way of a non-limiting example, the trigger signal can be determined by evaluating sensor data from a deposition sensor and/or as a function of weather data of a weather sensor and/or a weather data source. While sensor technologies have already been proposed to provide information about the weather per se or specifically about depositions forming on the motor vehicle, if the trigger signal is generated within the radar sensor itself or by the control apparatus by evaluating radar data. For example, it may be specifically provided that when radar data from the radar sensor are evaluated regarding the trigger signal, a noise behavior and/or proximity-area reflection behavior described by the radar data is evaluated. Particularly with radar sensors based on semiconductor technology, particularly CMOS technology, detections from the proximity area and/or noise fluctuations can also be detected and thus analyzed particularly well in the radar data, in such a manner that a change in the characteristics of the radar data caused by a deposition can be interpreted as just such a deposition. If such an indication of a restriction of the performance for a deposition is found, which can occur for example in the already mentioned control unit, the trigger signal is generated and the current radar data of the reference structure are recorded.

Further advantages and details of the present disclosure will become apparent from the embodiments described below and with reference to the drawings. In which:

FIG. 1 shows a schematic front view of a motor vehicle 1 according to the invention. This has a radar sensor 3 mounted in a covered manner in a bumper 2, which is directed toward the forefield of the motor vehicle 1. The radar sensor 3 is assigned a measuring arrangement 4 comprising an adjusting apparatus and a reference structure 5, which is also mounted in a covered manner behind a hatch in the bumper 2, wherein the reference structure 4 is in a rest setting.

Figure 2:
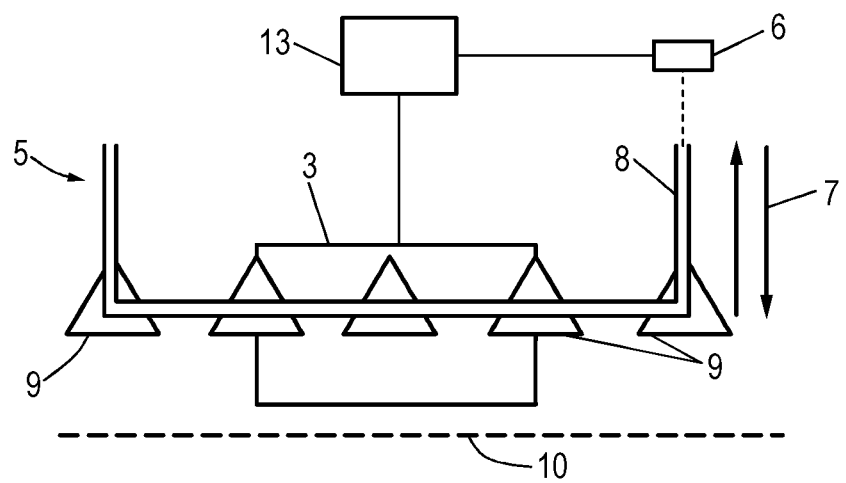
FIG. 2 shows a schematic front view of a reference structure in the measuring setting, in accordance with some embodiments.
Figure 3:
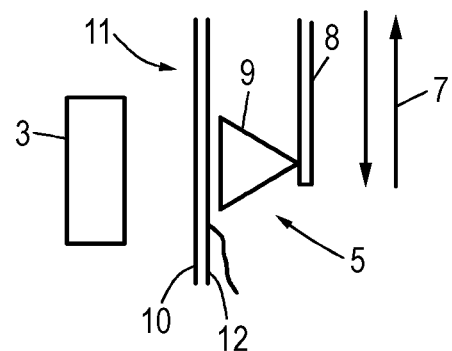
FIG. 3 shows a schematic side view of the reference structure in the measuring setting, in accordance with some embodiments.

By means of the adjusting apparatus 6 also shown in FIG. 2, the reference structure 5 can be moved from the rest setting shown in FIG. 1 into the measuring setting shown in FIG. 2 and FIG. 3 in front of the radar sensor 3, i.e., into the detection area thereof, as shown by the arrows 7.

It is obvious that the present reference structure 5 has a carrier member 8, particularly a metal bow, to which 5 retroreflectors 9, in the form of triple mirrors, are attached as markers. In the measuring setting, all retroreflectors 9 are within the detection area of radar sensor 3. The bumper element 10, behind which the radar sensor 3 is mounted in a covered manner, is only shown in FIG. 2 and, as it is evident in FIG. 3, forms a radome 11 for the radar sensor 3, after the radar radiation of the radar sensor 3 radiates through the bumper element 10 during the measuring operation to be able to perform the measurement. By way of a non-limiting example, if the radar sensor 3 is a non-covered construction, a part of the housing thereof may form a radome 11 and simultaneously form a part of the outer surface of the motor vehicle 1.

The bumper element 10 forms a part of the outer surface of the motor vehicle 1, in such a manner that depositions 12 (shown in FIG. 3) can be formed thereon, for example from snow, ice and the like. Such a deposition 12 can impair the performance of the radar sensor 3.

Therefore, the control apparatus 13, also shown in FIG. 2, of the radar arrangement formed by the measuring arrangement 4 and the radar sensor 3 is formed to perform the method according to the invention.

In the present case, this means that at a time when there is no deposition 12 on the radome 11, for example in the production process or in a workshop when the motor vehicle 1 is clean, the reference structure 5 is selectively displaced into the measuring setting in the detection area of the radar sensor 3 to record a comparison data set with the radar sensor, which is respectively stored in the control apparatus 13 and in corresponding memory means of the control apparatus 13.

In the following operation of the motor vehicle 1 and the radar sensor 3, the control apparatus 13, in this case in the form of a control unit of the radar sensor 3, is continuously checking whether indications of the presence of a deposition 12 on the radome 11 are present. For this purpose, the radar data of the radar sensor 3 are evaluated in their noise behavior and with regard to their proximity-area reflections to detect a drop in the performance, which could suggest a deposition 12. Once this instruction exists, therefore, for example a corresponding trigger criterion is fulfilled, a trigger signal is generated causing the control apparatus 13 to control the adjusting apparatus 6 to displace the reference structure 5 back into the detection area of the radar sensor 3, specifically into the predefined measuring setting. Once this has occurred, the radar sensor 3 records current radar data of the reference structure 5, whereafter following a short period of time, for example less than 2 seconds, the adjusting apparatus 6 is controlled again by the control apparatus 13 to displace the reference structure 5 back to the rest setting.

The control apparatus 13 evaluates the current radar data of the reference structure 5, in the present case by making a comparison with the comparison data set, namely regarding the retroreflectors 9 forming the markers, which form unique reflection centers even at short distances. A comparison criterion, to which at least one measure is assigned, is fulfilled if the deviation has a certain strength, which suggests a relevant deposition 12. If the appropriate comparison criterion is met, the assigned measure is performed by the control apparatus 13, for example, an instruction to a driver of the motor vehicle 1 and/or a correction procedure, particularly parameterized via the comparison result, and/or a labeling of future radar data recorded as less reliable. If the radar data of radar sensor 3 are no longer usable, the radar sensor 3 can also be at least temporarily deactivated.

Measures may also comprise the controlling of a defrosting apparatus for the radome 11 or the bumper element 10 if the motor vehicle 1 is equipped accordingly.

In this manner, a faster and more reliable detection of a restriction of the sensor perception is given by the radar sensor 3.

The invention claimed is:

1. A motor vehicle comprising:
   at least one radar sensor that is mounted behind a radome, wherein the radome is formed by a component of the motor vehicle to support radiation through the radome;
   an adjusting apparatus;
   a reference structure comprising at least one radar-detectable marker controlled by the adjusting apparatus and moved into a measuring position in a detection area of the radar sensor outside the radome; and
   a control apparatus configured to:
      control the adjusting apparatus for moving the reference structure into the measuring position; and
      evaluate radar data recorded by the at least one radar sensor, wherein the radar data corresponds to the reference structure in the measuring position based on comparison with a comparison data set stored in the control apparatus, and wherein the radar data is recorded without deposition on the radome for detection of the potential deposition.

2. The motor vehicle of claim 1, wherein the reference structure comprises at least one retroreflector in a predetermined position relative to the radar sensor in the measuring position, wherein the retroreflector is a triple mirror.

3. The motor vehicle of claim 2, wherein the at least one retroreflector is arranged on a carrier member, wherein the carrier member is a bow.

4. The motor vehicle of claim 1, wherein the radar sensor is directed toward a forefield of the motor vehicle, wherein the radar sensor is mounted in a covered manner in a front section of the motor vehicle, and wherein the reference structure is extended, using a hatch, from a covered rest position in the front section into the measuring position.

5. The motor vehicle of claim 4, wherein the component to be radiated through the radome is a bumper element of a bumper or a grille, wherein the adjusting apparatus is mounted in the bumper or the grille, and wherein the reference structure is arranged in a covered manner in the bumper or the grille in the rest position.

6. A method for operating a motor vehicle, the method comprising:
   recording a comparison data set of a reference structure located in a measuring setting for storing in a control apparatus in an absence of deposition on a radome including a radar sensor;
   in a presence of a trigger signal indicating the deposition on the radome restricting performance of the radar sensor, moving the reference structure into the measuring setting;
   evaluating radar data recorded by the radar sensor describing the reference structure in the measuring setting based on a comparison with a comparison data set stored in the control apparatus and recorded without the deposition on the radome for detection of the deposition.

7. The method of claim 6, further comprising triggering, by the control apparatus, at least one measure in response to determining the deposition on the radome, wherein the at least one measure is parameterized with a deposition strength established within a scope of the comparison.

8. The method of claim 7, wherein the at least one measure is one or more of an instruction output to a driver of the motor vehicle, a correction procedure of the radar data using the comparison result, and an output of a reliability value describing a reduced reliability, wherein the reduced reliability is a function of the deposition strength, having the radar data.

9. The method of claim 6, further comprising determining the trigger signal by evaluating the radar data of the radar sensor or sensor data of a deposition sensor.

10. The method of claim 6, further comprising determining the trigger signal as a function of weather data of a weather sensor or a weather data source.

11. The method of claim 9, further comprising evaluating a noise behavior or proximity-area reflection behavior based on the radar data from the radar sensor for determining the trigger signal.

* * * * *